Feb. 5, 1924.   1,482,473
W. S. LORD ET AL
MACHINE FOR COATING CONFECTION CENTERS WITH NUTS
Filed Oct. 30, 1922    2 Sheets-Sheet 1
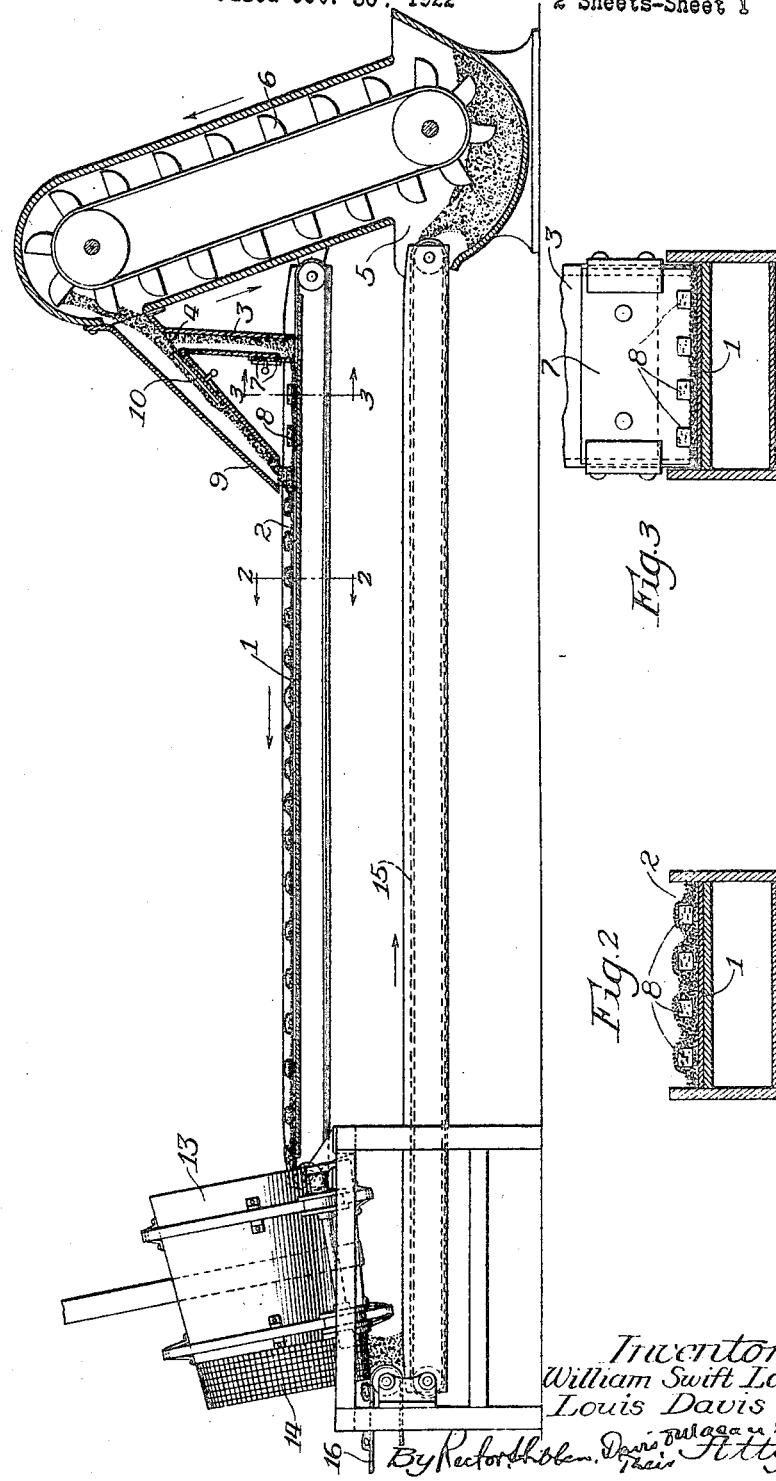

Feb. 5, 1924. 1,482,473
W. S. LORD ET AL
MACHINE FOR COATING CONFECTION CENTERS WITH NUTS
Filed Oct. 30, 1922 2 Sheets-Sheet 2
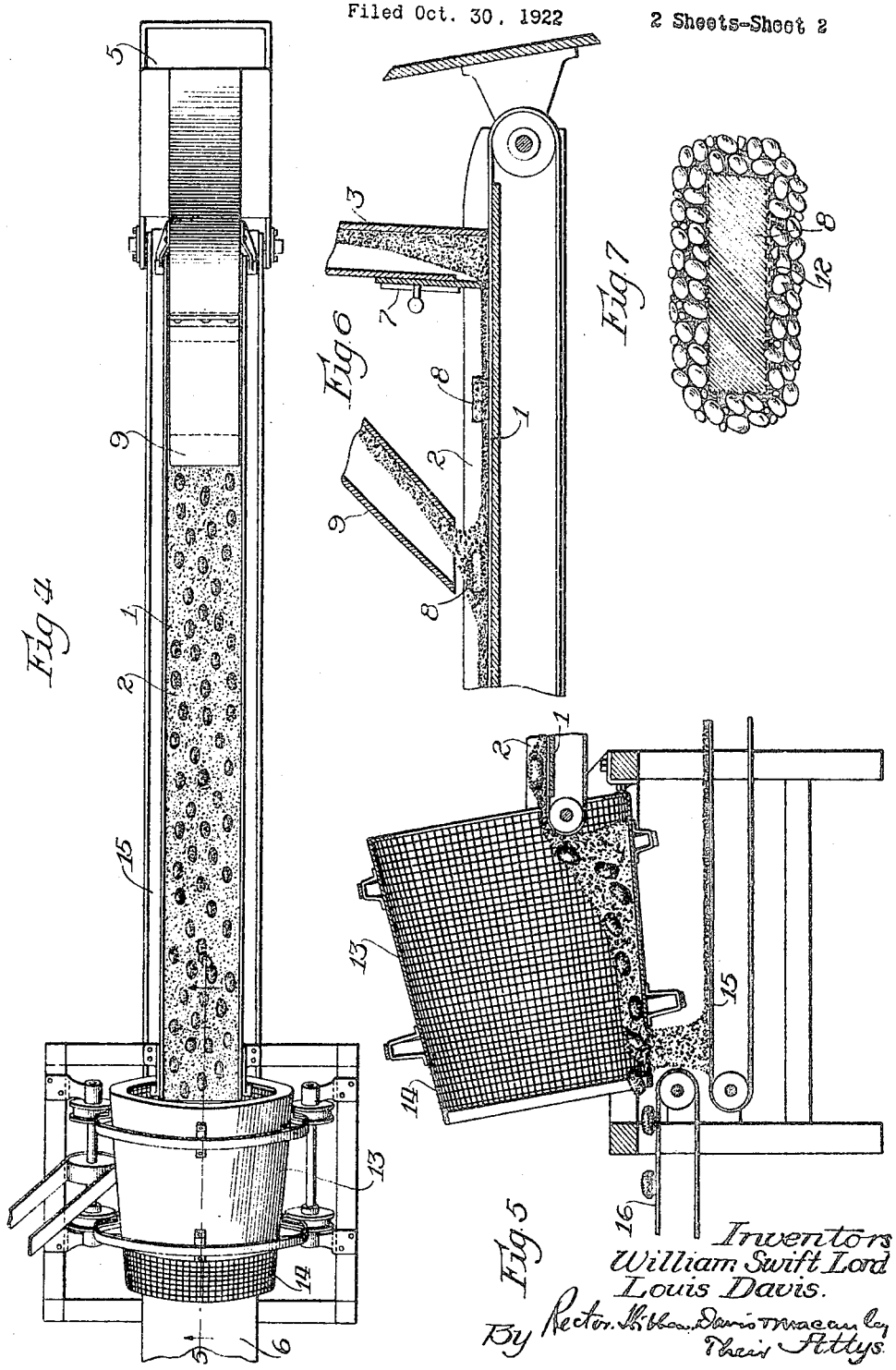
Inventors
William Swift Lord
Louis Davis.
By Rector, Hibben, Davis & Macauley
Their Attys.

Patented Feb. 5, 1924.

1,482,473

UNITED STATES PATENT OFFICE.

WILLIAM SWIFT LORD, OF EVANSTON, ILLINOIS, AND LOUIS DAVIS, OF BROOKLYN, NEW YORK, ASSIGNORS TO WILLIAMSON CANDY COMPANY, OF CHICAGO, ILLINOIS, A CORPORATION OF ILLINOIS.

MACHINE FOR COATING CONFECTION CENTERS WITH NUTS.

Application filed October 30, 1922. Serial No. 597,715.

*To all whom it may concern:*

Be it known that we, WILLIAM SWIFT LORD and LOUIS DAVIS, citizens of the United States, residing at Evanston, in the county of Cook and State of Illinois, and at Brooklyn, in the county of Kings, State of New York, respectively, have invented certain new and useful Improvements in Machines for Coating Confection Centers with Nuts, of which the following is a specification.

Our invention relates to a method and a machine for carrying out such method which we have devised for the particular purpose of applying a coating of peanuts to caramel-coated centers of sugar cream candy, these coated centers being intended to be subsequently coated with milk chocolate to produce a confection which has become popular and well-known under the trade-name "Oh Henry." As will be evident from the description hereinafter given, however, our machine is not limited to such use, but is adapted to accomplish the purpose of coating cores or centers of any material having an adhesive surface or coating with granular substances of whatever nature, the proportions or adjustment of the various parts of course being such as requisite in the particular case.

The object of our invention, speaking generally, is to devise a method of procedure through which the coating of such confection centers can be accomplished continuously on a large scale and with a greater capacity of production than that afforded by hand work, and to that end to devise a machine which shall perform its intended work properly and efficiently and enable a large number of centers to be coated by a relatively small number of operatives. With these objects in view we have devised the novel method of coating confection centers hereinafter set forth and have designed and invented the coating machine described in detail and our invention resides in the novel method followed and the combination of co-operating parts and members of the machine arranged and functioning as described, by which the results in view are accomplished, the essential elements of our invention being more particularly pointed out in the appended claims. It will be understood, however, that modification and variations of the structure described are possible without departure from our invention and within the true scope and intendment of the claims.

Of the acompanying drawings which form part of this specification, Figure 1, is a vertical longitudinal section taken centrally of the machine, certain parts thereof being shown in elevation; Figs. 2 and 3 are vertical cross sections on the lines 2—2 and 3—3 respectively of Fig. 1; Fig. 4 is a plan view of the machine; Fig. 5 is a central vertical section of the rear end of the machine, the plane of the section being indicated by the line 5—5 on Fig. 4; Fig. 6 is a fragmentary longitudinal vertical section passing through the bottom of the two chutes for depositing the nuts on the conveyor belt, on a larger scale than Fig. 1; and Fig. 7 is a section through one of the coated candy centers showing the adherent layer of peanuts collected in its passage through the machine.

The same reference characters indicate the same parts in all the figures of the drawings.

The stationary frame-work or machine frame of our new machine may be constructed of any suitable material or combination of materials, and may be designed in any manner to properly support the moving parts, and the means for supplying power to the conveyor belt, drum and other moving parts may vary according to circumstances and choice. For the sake of simplicity, therefore, we have illustrated in detail only the essential parts and elements necessary to an understanding of our invention, it being understood that supporting and driving members, which may be of any desired construction, are omitted.

In carrying out our invention we employ an automatic conveyor belt arranged to support a bed of peanuts upon which the candy centers are deposited by operatives, means for depositing a top covering of peanuts on the centers, and tumbling means for rolling and compacting the layers on the outside of the centers and for separating the coated centers from the surplus peanuts. In connection with the foregoing we provide a delivery belt for the coated centers, transfer means for lifting the peanuts from a supply receptacle to chutes for depositing them on the conveyor, and a return conveyor for returning the surplus nuts separated by the tumbling drum to the supply hopper.

Describing the parts of the machine more in detail and with reference to the drawings, the endless conveyor belt 1, driven by suitable means and travelling in the direction indicated by the arrow along the bottom of a trough 2, is arranged to be supplied near its front end with a bed of peanuts by the front discharge chute 3 of a divided passageway 4 to which the peanuts are elevated from a supply hopper or receptacle 5 by an elevator device 6. The front and side walls of the chute 3 just clear the conveyor belt, and an adjustable gate 7 provides a regulated opening at the bottom of the rear wall to govern the depth of the bed of nuts. Operatives stationed at the side of the machine place the candy centers 8 up on the bed of peanuts travelling from front to rear on the conveyor belt, and the centers are then covered in transit by a second layer coming down a rear discharge chute 9. The relative amounts of nuts passing through the chutes 3 and 9 are governed by a gate 10 which may be adjusted to divide the stream flowing down the passageway 4 and permit a proper proportion to enter each chute.

The confection upon which the machine was primarily designed to operate contains a center 11 of sugar cream candy which is solid but not tenaciously adhesive, surrounded by a coating of caramel 12 which permeates the layer of peanuts. In practice the candy centers, cold and cut into blocks of proper size, about 1½ inches long and from one-half to three-quarters of an inch square in its other two dimensions, are dipped by operatives in a kettle of warm liquified caramel, and then placed on the travelling bed of nuts between the two chutes. As shown, the conveyor belt has a somewhat extended travel for the purpose of permitting the caramel to cool somewhat in transit while permeating the layer of nuts immediately surrounding it and also slightly softening the center. By the time the centers reach the rotatably mounted tumbling drum 13, which is arranged at the rear or discharge end of the conveyor belt, the caramel has somewhat hardened and each individual center has collected an adherent coating of nuts, so that the rotation of the drum—at a moderate speed, and by any suitable means, not necessary to illustrate,—acts to compact the individual accretions of center and nuts, and imbed the nuts in the underlying matrix of caramel and softened sugar cream of each different center. It will be noted that the drum is conical, and that its axis is inclined from front to rear downwardly from a horizontal position to a greater degree than its bottom, which is but slightly inclined. From this construction it results that the rotation of the drum tends to work the contents gradually from front to rear. Since the bottom of the drum is but slightly inclined, the travel of the centers and nuts rearwardly through the drum is due mainly to the obliquity of the path of travel of points on the inner surface of the drum, and a very efficient tumbling action is attained. As the entire mass of individually coated centers and surplus nuts reach the screen 14 at the lower end of the drum the nuts are screened out and fall onto a suitably driven return conveyor belt 15, which returns them to the hopper 5, while the coated centers pass on through the open end of the drum onto a delivery belt 16, from which they are removed by operatives.

It is obvious that our machine may be adapted to operate without substantial changes upon any suitable confections as centers and upon other granular or shredded material than nuts as the coating materials, and we therefore intend our claims to be construed to embrace all equivalent and similar materials, and regard the adaptation of our machine to use with such other and equivalent materials, as coming fully within the spirit and scope of our invention and claims.

We claim:

1. In a machine of the character described, a conveyor belt, means for depositing a bed of nuts on said belt, means arranged rearwardly of said first-mentioned means for depositing on such bed a second layer of nuts, and a rotating tumbling drum arranged at the rear end of said conveyor belt.

2. In a machine of the character described, a conveyor belt, means for depositing a bed of nuts on said belt, means arranged rearwardly of said first-mentioned means for depositing on such bed a second layer of nuts, and a rotating tumbling drum arranged at the rear end of said conveyor belt, said drum being downwardly inclined at its rear and having a peripheral screen.

3. In a machine for applying coatings of nuts to confection centers, a supply receptacle for the nuts, a conveyor belt, transfer means for depositing a bed of nuts from said receptacle to said conveyor belt, means arranged rearwardly of said transfer means for depositing on such bed a second layer of nuts, a rotating tumbling drum arranged at the rear end of said conveyor belt, means being provided for screening surplus nuts from the coated centers, and a return conveyor belt for returning the surplus nuts to the supply receptacle.

4. In a machine for applying coatings of nuts to confection centers, a supply receptacle for the nuts, a conveyor belt, transfer means including two discharge chutes for depositing two layers of nuts at different points on said conveyor, and tumbling means for compacting the coated centers.

5. In a machine for applying coatings of nuts to confection centers, a supply receptacle for the nuts, a conveyor belt, transfer means including two discharge chutes for depositing two layers of nuts at different points on said conveyor, tumbling means for compacting the coated centers, means being provided for screening surplus nuts from the coated centers, and means for automatically returning the surplus nuts to the supply receptacle.

6. In a machine for applying coatings of nuts to confection centers, a supply receptacle for the nuts, a conveyor belt, transfer means including two discharge chutes, for depositing two layers of nuts at different points on said conveyor, a rotating open-ended tumbling drum downwardly inclined at its rear end and having adjacent such end a peripheral screen for separating surplus nuts from the coated centers, a delivery belt arranged to receive the coated centers passing through the tumbling drum, and a return conveyor for returning the surplus nuts to the supply receptacle.

7. In a machine for applying coatings of nuts to confection centers, a conveyor belt, a supply receptacle for the nuts arranged adjacent the front end of such belt, an elevator device arranged to elevate nuts from said supply receptacle, said elevator having two discharge chutes arranged to deposit two layers of nuts at different points on said conveyor belt.

8. In a machine for applying coatings of nuts to confection centers, a conveyor belt, a supply receptacle for the nuts arranged below the level of said belt adjacent the front end thereof, an elevator device arranged to elevate nuts from said supply receptacle, said elevator having a discharge passageway and branch chutes arranged to deposit two layers of nuts at different points on said conveyor belt, means adjacent the discharge end of the conveyor belt for separating the coated centers and surplus nuts, and a return conveyor below the level of said conveyor belt for returning the separate surplus nuts to the supply receptacle.

9. In a machine for applying coatings of nuts to confection centers, a conveyor belt, a supply receptacle for the nuts arranged adjacent the front end of such belt, an elevator device having a discharge passageway and two communicating chutes arranged to deposit two layers of nuts at different points on said belt and being provided with a gate for governing the relative proportions of nuts permitted to pass into said chutes.

10. In a machine of the character described, a conveyor belt arranged to convey a bed of peanuts and confection centers thereon, and a conical-shaped tumbling drum at the rear end of said conveyor belt arranged to receive said nuts and centers at its larger end and compact the centers and adherent nuts.

11. In a machine of the character described, a conveyor belt arranged to convey a bed of peanuts and confection centers thereon, and an open-ended tumbling drum at the rear end of said conveyor belt arranged to receive said nuts and centers at its front end and compact the centers and adherent nuts, said drum having adjacent its discharge end a peripheral screen arranged to screen out the surplus nuts from the coated centers.

12. The method of applying coatings of nuts to confection centers which consists in maintaining a continuous travelling bed of nuts, placing the centers thereon, laying down a second layer of nuts on the centers while in transit, and tumbling the mass of nuts and centers to compact individually the centers and adherent nuts.

13. The method of applying coatings of nuts to confection centers which consists in maintaining a continuous traveling bed of nuts, placing the centers thereon, then laying down a second layer of nuts on the centers while in transit, and then after said centers have partially cooled in further transit tumbling the mass of nuts and centers to compact individually the centers and adherent nuts.

14. The method of applying coatings of nuts to confection centers which consists in maintaining a continuous slowly traveling bed of nuts, placing the centers thereon, and then after said centers have partially cooled in further transit tumbling the mass of nuts and centers to compact individually the centers and adherent nuts.

WILLIAM SWIFT LORD.
LOUIS DAVIS.